(12) United States Patent
Mookerjee et al.

(10) Patent No.: US 7,277,047 B1
(45) Date of Patent: *Oct. 2, 2007

(54) REDUCED STATE ESTIMATION WITH BIASED MEASUREMENTS

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/347,974

(22) Filed: Feb. 6, 2006

(51) Int. Cl.
    *G01S 13/66* (2006.01)
(52) U.S. Cl. .......................... 342/195; 342/90
(58) Field of Classification Search ................. 342/195
    See application file for complete search history.

(56) References Cited

U.S. PATENT DOCUMENTS

| | | | |
|---|---|---|---|
| 4,179,696 A * | 12/1979 | Quesinberry et al. | 342/75 |
| 4,791,573 A * | 12/1988 | Zemany et al. | 701/221 |
| 5,325,098 A * | 6/1994 | Blair et al. | 342/95 |
| 5,432,816 A * | 7/1995 | Gozzo | 375/232 |
| 6,285,971 B1 * | 9/2001 | Shah et al. | 703/2 |
| 7,009,554 B1 * | 3/2006 | Mookerjee et al. | 342/195 |
| 2003/0115232 A1 * | 6/2003 | Lipp | 708/300 |
| 2004/0150551 A1 * | 8/2004 | Artebrant et al. | 342/95 |
| 2004/0223480 A1 * | 11/2004 | Nguyen et al. | 370/342 |
| 2005/0100082 A1 * | 5/2005 | Ma | 375/148 |
| 2005/0128138 A1 * | 6/2005 | McCabe et al. | 342/195 |
| 2005/0179580 A1 * | 8/2005 | Cong et al. | 342/70 |

OTHER PUBLICATIONS

"Target tracking algorithms for phased array radar", Wilkin, D.J.; Harrison, I.; Woolfson, M.S. Radar and Signal Processing, IEE Proceedings F vol. 138, Issue 3, Jun. 1991 pp. 255-262.*
"Target tracking based on Kalman-type filters combined with recursive estimation of model disturbances", Nordsjo, A.E. Radar Conference, 2005 IEEE International May 9-12, 2005 pp. 115-120.*
"Adaptive detection threshold optimization for tracking in clutter", Gelfand, SB.; Fortmann, T.E.; Bar-Shalom, Y. Aerospace and Electronic Systems, IEEE Transactions on vol. 32, Issue 2, Apr 1996 pp. 514-523.*
"Improved particle filters for ballistic target tracking", Bruno, M.G.S.; Pavlov, A. Acoustics, Speech, and Signal Processing, 2004. Proceedings. (ICASSP '04). IEEE Int'l Conference on vol. 2, May 17-21 , 2004 pp. ii-705-8.*

* cited by examiner

*Primary Examiner*—Thomas H. Tarcza
*Assistant Examiner*—Matthew M Barker
(74) *Attorney, Agent, or Firm*—Duane Morris, LLP

(57) ABSTRACT

This invention relates to sate estimation after processing measurements with unknown biases that may vary arbitrarily in time within known physical bounds. These biased measurements are obtained from systems characterized by state variables and by multidimensional parameters, for which the latter are also known and may vary arbitrarily in time within known physical bounds. The measurements are processed by a filter using a mean square optimization criterion that accounts for random and biased measurement errors, as well as parameters excursions, to produce estimates of the true states of the system. The estimates are applied to one of (a) making a decision, (b) operating a control system, and (c) controlling a process.

2 Claims, 2 Drawing Sheets

REDUCED STATE ESTIMATION WITH BIASED MEASUREMENTS

FIELD OF THE INVENTION

This application claims priority from U.S. Patent Application Ser. No. 11/112,907 entitled REDUCED STATE ESTIMATION WITH BIASED MEASUREMENTS filed on Apr. 22, 2005.

This invention relates generally to state estimation after processing measurements having unknown biases that may vary arbitrarily in time within known physical bounds. These measurements are obtained from systems characterized by state variables and by multidimensional parameters, for which the latter are also unknown and may vary arbitrarily in time within known physical bounds. In a particular aspect, the invention relates to the tracking of moving targets by multiple sensors, with different measurement bias for each sensor. The invention provides a computationally efficient recursive algorithm for optimally estimating the state of a system, using the criterion of minimizing the mean-square total error.

BACKGROUND OF THE INVENTION

FIG. 1 represents a simplified target tracking system 10. System 10 tracks a target, illustrated as being an aircraft 12, by the use of multiple radar systems 14, 16. Radar system 14 includes a radar antenna 14a, which transmits and receives radar signals illustrated by "lightning bolt" symbols 18. Portions of the transmitted signals 18 are reflected by target 12 and return to the radar antenna 14a. The returned signals allow the generation of measurements at an output port 14o of radar system 14. Radar system 16 includes a radar antenna 16a, which transmits and receives radar signals illustrated by "lightning bolt" symbols 20. Portions of the transmitted signals 20 are reflected by target 12 and return to the radar antenna 16a. The returned signals allow the generation of measurements at an output port 16o of radar system 16. These measurements include values of at least target position, possibly in the form of range and angles from the radar systems 14 and 16. A possible scenario is that radar systems 14 and 16 have measurements which are corrupted by unknown random measurement noises, characterized by a covariance and unknown time-varying biases with known bounds. The biases may be the result of sensor misalignment. The measurements are applied to a processing arrangement 22, which determines from the measurements various target parameters, which may include course (direction of motion), speed, and target type. The estimated position of the target, and possibly other information, is provided to a utilization apparatus or user, illustrated in this case as being a radar display 24. The operator (or possibly automated decision-making equipment) can make decisions as to actions to be taken in response to the displayed information. It should be understood that the radar tracking system 10 of FIG. 1 is only one embodiment of a general class of estimation systems for systems with distributed sensors such as nuclear, chemical, or manufacturing factories or facilities, control processes subject to external parameter changes, space station subject to vibrations, automobile subject to weather conditions, and the like.

State-of-the-art tracking systems utilize measurements fed to a processing site from multiple sensors. These sensors may have different measuring accuracies (i.e., random errors) and unknown measurement biases that may be time-varying within physical bounds.

Consider the problem of tracking an airplane whose trajectory in three dimensions is an arbitrary curve with bounded instantaneous turn rate and tangential acceleration. The parameters of this tracking problem are the turn rate $\omega$ (which can be related to the curvature of the trajectory) and the tangential acceleration $\alpha$. Sensors, such as multiple radars, observe the position of this airplane. Each sensor is subject to alignment errors which cause it to be rotated by an unknown amount from its nominal alignment, that is a consequence of imperfect mechanical mounting, flexure of the array structure due to temperature effects etc. These small or infinitesimal rotations constitute a vector b. The parameters, $\omega$, $\alpha$, and b are neither exclusively constant nor strictly white noise stochastic processes, but vary arbitrarily in time within physical bounds.

This problem belongs to a more general problem of estimating the state of a system using biased measurements. In prior art, the Kalman filter solves this problem in some situations by including the biases as part of an augmented state to be estimated. Such a filter is termed herein a "full state" estimator. An example of the Kalman filter bias estimation approach has been described in Y. Kosuge and T. Okada, "Minimum Eigenvalue Analysis Using Observation Matrix for Bias Estimation of Two 3- Dimensional Radars," Proceedings of the 35$^{th}$ SICE Annual Conference, pp. 1083-1088, July 1996, Y. Kosuge and T. Okada, "Bias Estimation of Two 3-Dimensional Radars Using Kalman Filter," Proceedings of the 4$^{th}$ International Workshop on Advanced Motion Control, pp. 377-382, March 1996, N. Nabaa and R. H. Bishop, "Solution to a Multisensor Tracking Problem with Sensor Registration Errors," IEEE Transactions on Aerospace and Electronic Systems, pp. 354-363, Vol. 35, No. 1, January 1999, and E. J. Dela Cruz, A. T. Alouani, T. R. Rice, and W. D. Blair, "Estimation of Sensor Bias in Multisensor Systems," Proceedings of IEEE Southeastcon 1992, pp. 210-214, Vol. 1, Apr. 12-15, 1992. However, the biases may vary too erratcially to be considered as observables. In the case in which biases cannot be estimated, filters, which do not augment the state vector with these parameters, often give better performance. Such a filter is termed herein a "reduced state" estimator. More generally, a "reduced state" or "reduced order" estimator uses fewer states than would be required to completely specify the system.

Difficulties of using a Kalman filter in other contexts, dealing with unknown time-varying bounded parameters affecting system dynamics are discussed in copending patent applications entitled "REDUCED STATE ESTIMATOR FOR SYSTEMS WITH PHYSICALLY BOUNDED PARAMETERS" and "REDUCED STATE ESTIMATION WITH MULTISENSOR FUSION AND OUT-OF-SEQUENCE MEASUREMENTS", filed on or about Mar. 16, 2005 and Mar. 30, 2005, respectively, both in the names of P. Mookerjee and F. Reifler. These difficulties are also found in P. Mookerjee and F. Reifler, "Reduced State Estimators for Consistent Tracking of Maneuvering Targets," IEEE Transactions on Aerospace and Electronic Systems (in press). P. Mookerjee and F. Reifler in "Reduced State Estimator for Systems with Parametric Inputs," IEEE Transactions on Aerospace and Electronic Systems, pp. 446-461, Vol. AE-40, No. 2, April 2004.

The method of the prior art is to estimate the sensor bias by way of a Kalman filter using state augmentation. Improved or alternative estimators are desired for coping with biased measurements.

SUMMARY OF THE INVENTION

In general, the invention relates to state estimation derived from processing biased measurements. The invention is particularly applicable to state estimation when these biases are not constant, but vary arbitrarily in time within known physical bounds.

A method according to an aspect of the invention is for recursively estimating the state of a system having multidimensional parameters in addition to state variables and biased measurements, which parameters are unknown, arbitrarily time-varying, except for known bounded values. For example, the turn rate and tangential acceleration of an aircraft are multidimensional arbitrarily time-varying parameters that have known bounds, in addition to the state of the aircraft given by its position and velocity. Said state estimates are derived from measurements subject to bias and random errors. The state estimates are used to make decisions or to operate a control system or to control a process.

A method according to another aspect of the invention is to apply the biased measurements to an estimating filter that explicitly uses a mean square optimization criterion that separately accounts for measurements bias and parameter excursions and their bounding values to produce estimates of the true state of the system. The measurements are applied to an estimating filter that explicitly uses a mean square optimization criterion that separately accounts for measurement errors and said bounds on measurements biases and parameter bounds. The said estimates are applied to one of (a) make a decision, (b) operate a control system, and (c) control a process.

An aspect of the invention relates to estimating the state of a system having multidimensional parameters $\lambda$ in addition to state variables $x(k)$ at time $t_k$ for $k=0,1,2,\ldots$, which parameters $\lambda$ are unknown, arbitrarily time-varying, but bounded, and driven by the nonlinear input function $u(x(k)\lambda)$ and expressed by the state equation $$x(k+1) = \Phi_x(k) + \Gamma u(x(k),\lambda) \qquad (1)$$

where $\Phi$, $\Gamma$ are system matrices dependent on the discrete time interval $T = t_{k+1} - t_k$.

Another aspect of the invention relates to measuring aspects of the state of the system expressed by the measurement equation $$z(k) = Hx(k) + Jb + n(k) \qquad (2)$$

where b is an unknown, arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$ for $k=1,2,3,\ldots$;

The method comprises the steps of:

(a) Measuring aspects of the state of the system to produce initial measurements;

(b) Initializing a filter with an initial state estimate $\hat{e}(k_0|k_0)$ and matrices $M(k_0|k_0)$, $D(k_0|k_0)$, $E(k_0|k_0)$ associated with the initial state covariance and using a priori information and the initial measurements $z(i)$ for $1 \leq i \leq k_0$ ($k_0 = 0$ if no measurement are used in the initialization of the filter). In general, a vector $\hat{x}(j|k)$ is defined as the estimate of the state of the system at time $t_j$ and for $j=0,1,2,\ldots$ after processing k measurements $z(i)$ for $1 \leq i \leq k$. Matrix $M(j|k)$ is defined as the covariance of the state estimation errors at time $t_j$ due only to the random errors in the measurements $z(i)$ for $1 \leq i \leq k$ and a priori initial information that is independent of the parameter uncertainty and measurement bias uncertainty for $j=0,1,2,\ldots$. Matrix $D(j|k)$ is defined as the matrix of bias coefficients, which linearly relates state estimation errors to the parameter errors, at time $t_j$ for $j=0,1,2,\ldots$ after processing k measurements $z(i)$ for $1 \leq i \leq k$. Matrix $E(j|k)$ is defined as the matrix of bias coefficients, which linearly relates state estimation errors to the sensors measurement bias, at time $t_j$ for $j=0,1,2,\ldots$ after processing k measurements $z(i)$ for $1 \leq i \leq k$. The use of the matrices $M(j|k)$, $D(j|k)$, and $E(j|k)$ instead of $S(j|k)$ is a difference of the current invention from the prior art;

(c) Measuring aspects $z(k)$ of the state of the system where b is an unknown arbitrarily time-varying, but bounded, measurement bias vector with covariance B, whose components correspond to the different sensors, and where the sensor selector matrix J selects the appropriate components of sensor bias, and where $n(k)$ is the measurement noise with covariance N and measurement matrix H at time $t_k$ for $k > k_0$;

(d) Determining the time $t_{k+1}$ of a new measurement $z(k+1)$ and the time $t_k$ of the previous measurement $z(k)$. Using the update interval $T = t_{k+1} - t_k$, determine the system transition matrices $\Phi$ and $\Gamma$. Also determine the mean value $\bar{\lambda}$ of unknown but bounded parameters $\lambda$, and the input vector $u(\hat{x}(k|k),\bar{\lambda})$;

(e) Determining F,G using $$F = \Phi + \Gamma \frac{\partial u}{\partial x}\bigg|_{x=\hat{x}(k|k),\lambda=\bar{\lambda}} \qquad (3)$$

$$G = \Gamma \frac{\partial u}{\partial \lambda}\bigg|_{x=\hat{x}(k|k),\lambda=\bar{\lambda}} \qquad (4)$$

(f) Generating a parameter matrix $\Lambda$, representing physical bounds on those parameters that are not state variables of the system;

(g) Extrapolating said state estimates $\hat{x}(k|k)$ and matrices $M(k|k)$, $D(k|k)$, $E(k|k)$, $S(k|k)$ to $\hat{x}(k+1|k)$, $M(k+1|k)$, $D(k+1|k)$, $E(k+1|k)$ and $S(k+1|k)$ as follows $$\hat{x}(k+1|k) = \Phi\hat{x}(k|k) + \Gamma u(\hat{x}(k|k),\bar{\lambda}) \qquad (5)$$

$$M(k+1|k) = FM(k|k)F' \qquad (6)$$

$$D(k+1|k) = FD(k|k) + G \qquad (7)$$

$$E(k+1|k) = FE(k|k) \qquad (8)$$

$$S(k+1|k) = M(k+1|k) + D(k+1|k)\Lambda D(k+1|k)' + E(k+1|k)BE(k+1|k)' \qquad (9)$$

(h) Determining covariance of the residual Q as follows $$V = HE(k+1|k) + J \qquad (10)$$

$$Q = H[M(k+1|k) + D(k+1|k)\Lambda D(k+1|k)']H' + VBV' + N \qquad (11)$$

(i) Determining the filter gain matrix K as follows $$A = S(k+1|k)H' + E(k+1|k)BJ' \qquad (12)$$

$$K = AQ^{-1} \qquad (13)$$

(j) Determining the matrix L as follows $$L = I - KH \quad (14)$$

where I is the identity matrix;

(k) Updating the state estimate $\hat{x}(k+1|k)$ as follows $$\hat{x}(k+1|k'1) = \hat{x}(k+1|k) + K[z(k+1) - H\hat{x})k+1|k)] \quad (15)$$

(l) Updating the matrices $M(k+1|k)$, $D(k+1|k)$, and $E(k+1|k)$ as $$M(k+1|k+1) = LM(k+1|k)L' + KNK' \quad (16)$$

$$D(k+1|k+1) = LD(k+1|k) \quad (17)$$

$$E(k+1|k+1) = LE(k+1|k) - KJ \quad (18)$$

and (m) Generating the total mean square error $S(k+1|k+1)$ as follows $$S(k+1|k+1) = M(k+1|k+1) + D(k+1|k+1)\Lambda D(k+1|k+1)' + E(k+1|k+1)BE(k+1|k+1)' \quad (19)$$

DESCRIPTION OF THE INVENTION

Figure 1:
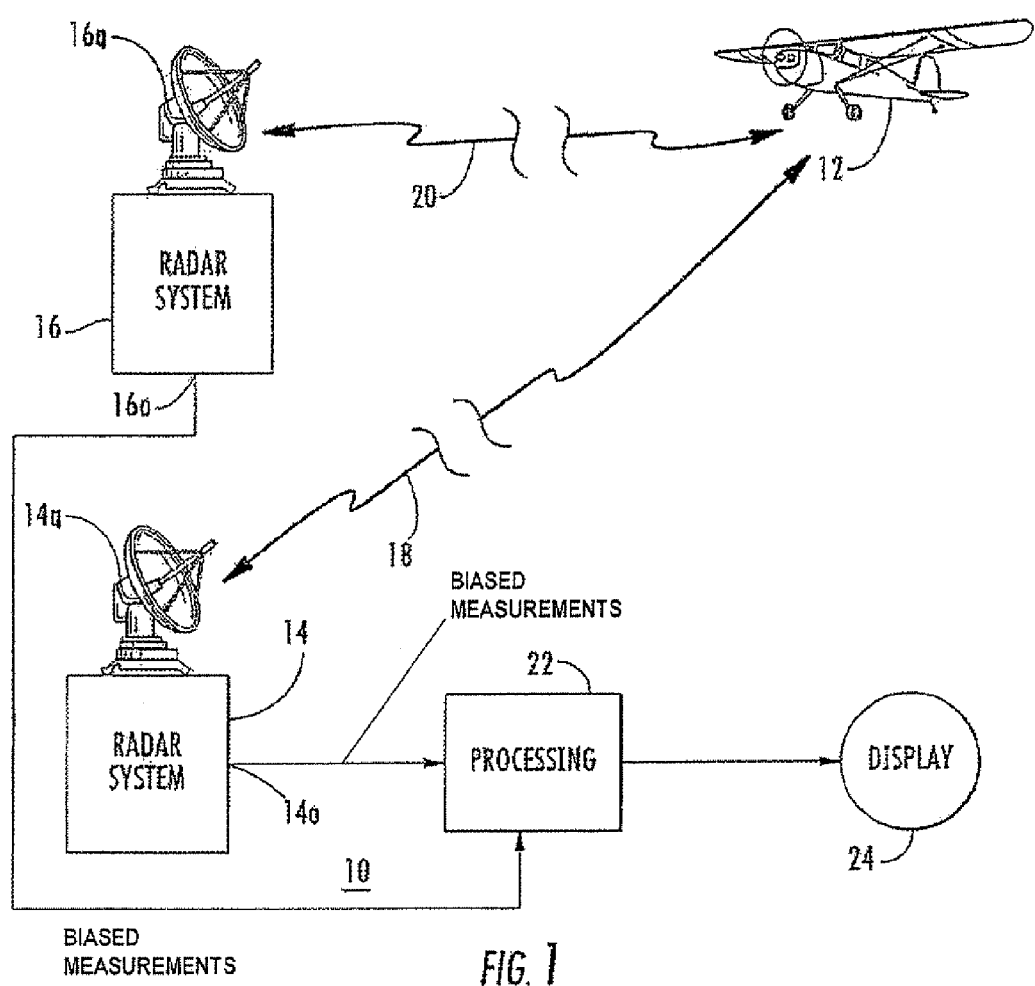
FIG. 1 is a simplified block diagram of a system for estimating the state of a target, which in this case is the track of an aircraft performing bounded maneuvers, after processing measurements with biases and random errors from multiple sensors.
Figure 2:
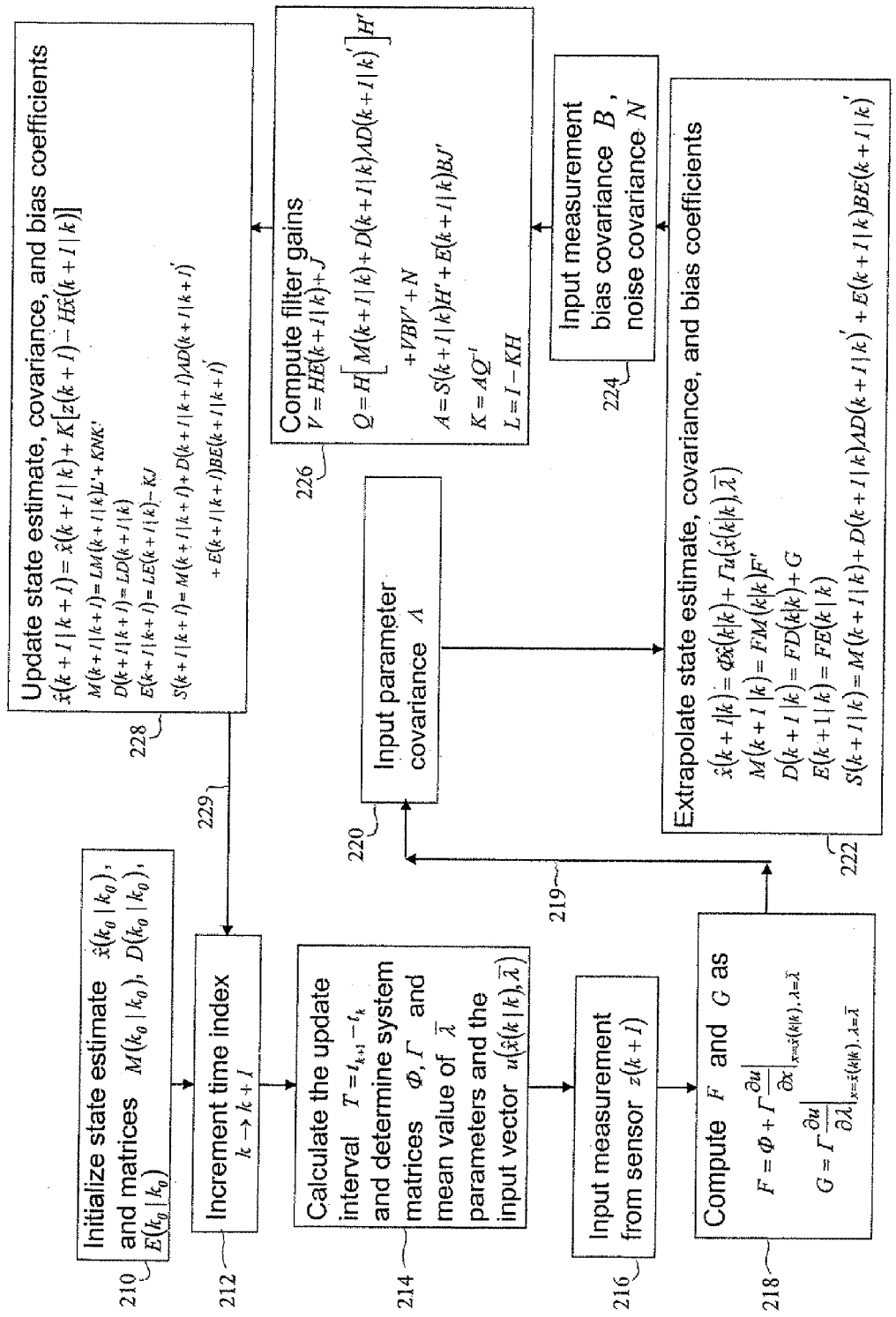
FIG. 2 is a simplified logic flow chart or diagram illustrating the recursive processing associated with a reduced-state estimator according to an aspect of the invention, which may be used in the arrangement of FIG. 1.

State estimation after processing measurements with unknown biases that may vary arbitrarily in time within known physical bounds is considered. These measurements are obtained from systems characterized by state variables and by multidimensional parameters, for which the latter are unknown and may vary arbitrarily in time within known physical bounds. The solution of the problem requires a completely different method from the prior art. The simplified logic flow chart or diagram 200 of FIG. 2 illustrates a method according to an aspect of the invention. In FIG. 2, the logic flow of the invention begins in a block 210 with initialization of the state estimate $\hat{x}(k_0|k_0)$ and the matrices $M(k_0|k_0)$, $D(k_0|k_0)$, $E(k_0|k_0)$. In general, a vector $\hat{x}(j|k)$ is defined as the estimate of the state of the system at time $t_j$ for $j=0,1,2,\ldots$ after processing k measurements $z(i)$ for $1 \leq i \leq k$. Matrix $M(j|k)$ is defined as the covariance of the state estimation errors at time $t_j$ for $j=0,1,2,\ldots$ due only to the random errors in the measurements $z(i)$ for $1 \leq i \leq k$ and a priori initial information that is independent of the parameter uncertainty and measurement bias uncertainty. Matrix $D(j|k)$ is defined as the matrix of bias coefficients, which linearly relates state estimation errors to the parameter errors, at time $t_j$ for $j=0,1,2,\ldots$ after processing k measurements $z(i)$ for $1 \leq i \leq k$. Matrix $E(j|k)$ is defined as the matrix of bias coefficients, which linearly relates state estimation errors to the sensor measurement bias, at time $t_j$ for $j=0,1,2,\ldots$ after processing k measurements $z(i)$ for $1 \leq i \leq k$. The use of the matrices $M(j|k)$, $D(j|k)$, and $E(j|k)$ instead of $S(j|k)$ is a difference of the current invention from the prior art.

From block 210, the logic of the invention of FIG. 2 flows to a block 212, which represents the incrementing of a time index k to k+1.

The logic of FIG. 2 then flows to a further block 214, which represents calculating the update interval according to $$T = t_{k+1} - t_k \quad (20)$$

and determining the system transition matrices $\Phi$, $\Gamma$, and the mean value $\bar{\lambda}$ of unknown but bounded parameters $\lambda$ and also the input vector $u(\hat{x}(k|k),\bar{\lambda})$. Note that for the update interval $T = t_{k+1} - t_k$, the time $k_k$ denotes the time of the previous measurement, whereas $t_{k+1}$ is the time of the new measurement.

From block 214 of FIG. 2, the logic of FIG. 2 flows to a block 216, which represents the measurement $z(k+1)$ of aspects of the state of the system. This step is same as the corresponding step of the prior art.

The logic of FIG. 2 flows to block 218 of FIG. 2 that represents calculation of the matrices F and G according to $$F = \Phi + \Gamma \frac{\partial u}{\partial x}\bigg|_{x=\hat{x}(k|k),\lambda=\bar{\lambda}} \quad (21)$$

$$G = \Gamma \frac{\partial u}{\partial \lambda}\bigg|_{x=\hat{x}(k|k),\lambda=\bar{\lambda}} \quad (22)$$

From block 218 of FIG. 2, the logic of FIG. 2 flows to a block 220 by way of a logic path 219, which accesses or inputs a parameter matrix $\Lambda$. The parameter matrix $\Lambda$ represents the physical bounds on the unknown parameters, such as turn rate and tangential acceleration, and is preferably selected based on a description of the physical system, which should be a precise as possible or practicable. The parameter matrix $\Lambda$ depends upon well-known physical phenomena and characteristics of real systems. Types of physical parameters, which might be considered for determination of $\Lambda$ in the case of maneuvers, are the turn rate $\omega$ and the tangential acceleration $\alpha$. This is a departure from the prior art, which uses a white process noise covariance W that does not correctly model the class of systems addressed by the invention herein.

From block 220 of FIG. 2, the logic flow proceeds to a block 222, which represents the extrapolation of state estimates $\hat{x}(k|k)$, and matrices $M(k|k)$, $D(k|k)$, and $E(k|k)$ according to $$\hat{x}(k+1|k) = \Phi\hat{x})k|k) + \Gamma u(\hat{x}(k|k),\bar{\lambda}) \quad (23)$$

$$M(k+1|k) = FM(k|k)F' \quad (24)$$

$$D(k+1|k) = FD(k|k) + G \quad (25)$$

$$E(k+1|k) = FE(k|k) \quad (26)$$

and the calculation of the state covariance $S(k+1|k)$ according to $$S(k+1|k) = M(k+1|k) + D(k+1|k)\Lambda D(k+1|k)'E(k+1|k)BE(k+1|k)' \quad (27)$$

Thus, another difference between the invention herein and the prior art is that the prior art Kalman filter extrapolates state estimate $\hat{x}(k|k)$ and state covariance $S(k|k)$ to $\hat{x}(k+1|k)$ and $S(k+1|k)$, while the current invention extrapolates state estimate $\hat{x}(k|k)$ and matrices $M(k|k),D(k|k),E(k|k)$ to $\hat{x}(k+1|k)$ and $M(k+1|k),D(k+1|k),E(k+1|k)$ respectively.

From block 222 of FIG. 2, the logic flows to a block 224, which represents the accessing or inputting of the measurement bias covariance B and measurement noise covariance N.

Block 226 of FIG. 2 computes filter matrices V,Q,A, filter gain matrix K, and filter matrix L. While generically similar to the prior art, the filter gain matrix K obtained in block 226 of the arrangement of FIG. 2 are different from the filter gain matrix K obtained in prior art because of the use of M(k+1|k),D(k+1|k),E(k+1|k) and Λ,B to formula S(k+1|k) in equation (27). The covariance of the residual Q is calculated as $$V=HE(k+1|k)+J \quad (28)$$

$$Q=H[M(k+1|k)+D(k+1|k)\Lambda D(k+1|k)']H'+VBV'+N \quad (29)$$

The filter gain matrix K is calculated as $$A=S(k+1|k)H'+E(k+1|k)BJ' \quad (30)$$

$$K=AQ^{-1} \quad (31)$$

and the matrix L is calculated as $$L=I-KH \quad (32)$$

where I is the identity matrix.

The logic flows from block 226 of FIG. 2 to a block 228, which represents the updating of the state estimate and the associated matrices. More particularly, the state estimate $\hat{x}(k+1|k+1)$ is calculated as $$\hat{x}(k|k+1)=\hat{x})k+1|k)+K[z(k+1)-H\hat{x}(k+1|k)] \quad (33)$$

The matrices M(k+1|k+1), D(k+1|k+1), E(k+1|k+1) are calculated as $$M(k+1|k+1)=LM(k+1|k)L'+KNK' \quad (34)$$

$$D(k+1|k+1)=LD(k+1|k) \quad (35)$$

$$E(k+1|k+1)=LE(k+1|k)-KJ \quad (36)$$

respectively. Finally, the matrix of the total covariance S(k+1|k+1) is calculated as $$S(k+1|k+1)=M(k+1|k+1)+D(k+1|k+1)\Lambda D(k+1|k+1)'+E(k+1|k+1)BE(k+1|k+1)' \quad (37)$$

The logic leaves block 228 of FIG. 2 and returns to block 212 of FIG. 2 by way of a logic path 229.

The calculation associated with blocks 222 and 228 of FIG. 2 separate the state estimation error covariance S(j|k) into components, M(j|k), D(j|k)ΛD(j|k)', E(j|k)BE(j|k)' attributable to random measurement error, parameter uncertainty, and measurement biases, and separately propagates these covariances from one time index k to next time index k+1. In addition, the gain matrix K is computed based on these propagated covariances. The gains weight the measurements to form the state estimates. The values of these gains so computed are different from those computed by the prior art method.

A salient difference between the prior-art method and that of the invention is the introduction into the equations of the matrices M(j|k), D(j|k), and E(j|k). The matrix M(j|k) is defined as the covariance of the state estimation errors at time $t_j$ due only to the errors in the measurements z(i) for $1 \leq i \leq k$ and a priori initial information that is independent of the parameter uncertainty and measurement bias uncertainty. D(j|k) is defined as the matrix of bias coefficients, which linearly relates state estimation errors to the parameter errors, at time $t_j$ for j=0,1,2, . . . after processing k measurements z(i) for $1 \leq i \leq k$. E(j|k) is defined as the matrix of bias coefficients, which linearly relates state estimation errors to the sensor measurement bias, at time $t_j$ for j=0,1,2, . . . after processing k measurements z(i) for $1 \leq i \leq k$.

The invention uses a novel mean-square optimization criterion (equation (37)) which explicitly addresses the known physical bounds of the multidimensional system parameters and sensor biases, and incorporates analytical modeling of their bounds. The invention provides a computationally efficient recursive algorithm for optimally estimating the state of a system, using the criterion of minimizing the mean-square total error.

What is claimed is:

1. A method for recursively estimating the state of a system having multidimensional parameters λ in addition to state variables x(k) at time $i_k$ for k=0,1,2, . . . , which parameters λ are unknown, arbitrarily time-varying, but bounded, and driven by the input function u(x(k),λ), which may be nonlinear, and expressed by the state equation $$x(k+1)=\Phi x(k)+\Gamma u(x(k),\lambda) \quad (38)$$

where Φ,Γ are system matrices dependent on the discrete time interval $T=t_{k+1}-t_k$, said method comprising the following steps:

measuring aspects of the state of the system to produce initial measurements expressed by the measurement equation $$z(k)=Hx(k)+Jb+n(k) \quad (39)$$

for $1 \leq k \leq k_0$, where, if no measurements are used in the initialization of the filter, $k_0=0$, where b is an unknown arbitrarily time-varying, but bounded, measurement bias vector with covariance B, whose components correspond to the different sensors, and where the sensor selector matrix J selects the appropriate components of sensor bias, and where n(k) is the measurement noise with covariance N and measurement matrix H at time $l_k$;

initializing state estimates $\hat{x}(k_0|k_0)$ and the matrices $M(k_0|k_0)$, $D(k_0|k_0)$, $E(k_0|k_0)$ using a priori information and the initial measurements, where vector $\hat{x}(j|k)$ is defined as the estimate of the state of the system at time $t_j$ for j=0,1,2, . . after processing k measurements z(i) for $1 \leq i \leq k$;

matrix M(j|k) is defined as the covariance of the state estimation errors at time $l_j$ for j=0,1,2, . . . due only to the random errors in the k measurements r(f) for $1 \leq i \leq k$ and a priori initial information that is independent of the parameter uncertainty and measurement bias uncertainty;

matrix D(j|k) is defined as the matrix of bias coefficients, which linearly relates state estimation errors to the parameter errors, at time $1_j$ for j=0,1,2, . . . after processing k measurements x(t) for $1 \leq i \leq k$;

matrix E(j|k) is defined as the matrix of bias coefficients, which linearly relates state estimation errors to the sensor measurement bias, at time $t_j$ for j=0,1, 2, . . . after processing k measurements z(l) for $1 \leq i \leq k$;

measuring aspects z(k) of the state of the system expressed by the measurement equation $$z(k)=Hx(k)+Jb+n(k) \quad (40)$$

where b is an unknown arbitrarily time-varying, but bounded, measurement bias vector with covariance B, whose components correspond to the different sensors, and where the sensor selector matrix J selects the appropriate components of sensor bias, and where n(k) is the measurement noise with covariance N and measurement matrix H at time $i_k$ for $k \leq k_0$;

determining the system transition matrices $\Phi$ and $\Gamma$ using the update interval $T = t_{k+1} - t_k$ when a new measurement x(k+1) arrives at time $t_{k+1}$;

determining the mean value $\bar{\lambda}$ of unknown but bounded parameters $\lambda$, and the input vector $u(\hat{x}(k|k),\bar{\lambda})$;

determining F,G using $$F = \Phi + \Gamma \frac{\partial u}{\partial x}\bigg|_{x=\hat{x}(k|k),\lambda=\bar{\lambda}} \quad (41)$$

$$G = \Gamma \frac{\partial u}{\partial \lambda}\bigg|_{x=\hat{x}(k|k),\lambda=\bar{\lambda}} \quad (42)$$

generating a parameter matrix $\Lambda$, representing physical bounds on those parameters that are not state variables of the system;

extrapolating said state estimates $\hat{x}(k|k)$ and matrices M(k|k), D(k|k), E(k|k), S(k|k) to $\hat{x}(k+1|k)$, M(k+1|k), D(k+1|k), E(k+1|k) and S(k+1|k) as $$\hat{x}(k+1|k) = \Phi\hat{x})k|k) + \Gamma u(\hat{x}(k|k),\bar{\lambda}) \quad (43)$$

$$M(k+1|k) = FM(k|k)F' \quad (44)$$

$$D(k+1|k) = FD(k|k) + G \quad (45)$$

$$E(k+1|k) = FE(k|k) \quad (46)$$

$$S(k+1|k) = M(k+1|k) + D(k+1|k(\Lambda D)k+1|k)'E(k+1|k)BE(k+1|k)' \quad (47)$$

determining covariance of the residual Q as $$V = HE(k+1|k) + J \quad (48)$$

$$Q = H[M(k+1|k) + D(k+1|k)\Lambda D)k+1|k)']H' + VBV + N \quad (49)$$

determining the filter gain matrix K as $$A = S(k+1|k)H' + E(k+1|k)BJ' \quad (50)$$

$$K = AQ^{-1} \quad (51)$$

determining the matrix L as $$L = 1 - KH \quad (52)$$

where I is the identity matrix;

updating the state estimate $\hat{x}(k+1|k)$ as $$\hat{x}(k+1|k+1) = \hat{x})k+1|k) + K[z)k+1) - H\hat{x})k+1|k) \quad (53)$$

updating the matrices M(k+1|k), D(k+1|k), E(k+1|k) as $$M(k+1|k+1) = LM(k+1|k)L' + KNK' \quad (54)$$

$$D(k+1|k+1) = LD(k+1|k) \quad (55)$$

$$E(k+1|k+1) = LE)k+1|k) - KJ \quad (56)$$

respectively, and generating the total mean square error S(k+1|k+1) as $$S(k+1|k+1) = M)k+1|k+1) + D(k+1|k+1)\Lambda D(k+1|k+1)' + E(k+1|k+1)BE(k+1|k+1)' \quad (57).$$

2. A method for estimating the state of a system comprising the steps of:

observing a system having state variables and also having unknown, multidimensional, arbitrarily time-varying parameters, but which are subject to known bounded values;

measuring certain aspects of the state of the system in the presence of sensor measurement biases and random errors to produce initial measurements;

initializing state estimates and matrices using a priori information and the initial measurements;

using the update interval in determining the system transition matrices and the mean value of unknown but bounded parameters and the input vector;

applying the measurements to an estimating filter that explicitly uses a mean square optimization criterion that separately accounts for measurement biases and errors and said bounding values, to produce estimates of the true state of the system; and applying said estimates to one of (a) make a decision (b) operate a control system, and (c) control a process.

* * * * *